United States Patent [19]

McKaveney

[11] 4,284,072

[45] Aug. 18, 1981

[54] SOLAR COLLECTORS WITH SOLAR PANELS HAVING A PARTICULATE FERRO-ALLOY SURFACE

[75] Inventor: James P. McKaveney, Claremont, Calif.

[73] Assignee: Occidental Research Corp., Irvine, Calif.

[21] Appl. No.: 954,817

[22] Filed: Oct. 26, 1978

[51] Int. Cl.³ .......................... F24J 3/02; F28F 13/18
[52] U.S. Cl. .................................. 126/901; 126/447; 126/449; 165/133; 165/185
[58] Field of Search ............... 126/901, 449, 446, 447; 165/DIG. 8, 133, 185

[56] References Cited

U.S. PATENT DOCUMENTS

| 3,129,703 | 4/1964 | Tabor | 126/901 |
|---|---|---|---|
| 3,176,678 | 4/1965 | Langley | 126/901 |
| 3,272,986 | 9/1966 | Schmidt | 126/901 |
| 4,048,039 | 9/1977 | Daxinger | 126/901 |
| 4,048,980 | 9/1977 | Googin et al. | 126/901 |
| 4,055,707 | 10/1977 | McDonald | 126/901 |
| 4,122,239 | 10/1978 | Riboulet | 126/901 |
| 4,145,462 | 3/1979 | Kuwabara | 126/901 |

FOREIGN PATENT DOCUMENTS 2551832  4/1977  Fed. Rep. of Germany ........... 126/901

Primary Examiner—Daniel J. O'Connor

[57] ABSTRACT

The efficiency of a solar collector is increased by the use of a solar panel having an adherent coating of a comminuted ferro-alloy. The ferro-alloy displays a high degree of absorption of solar energy in the visible range and a minimal of infrared radiation.

27 Claims, 1 Drawing Figure

U.S. Patent    Aug. 18, 1981    4,284,072
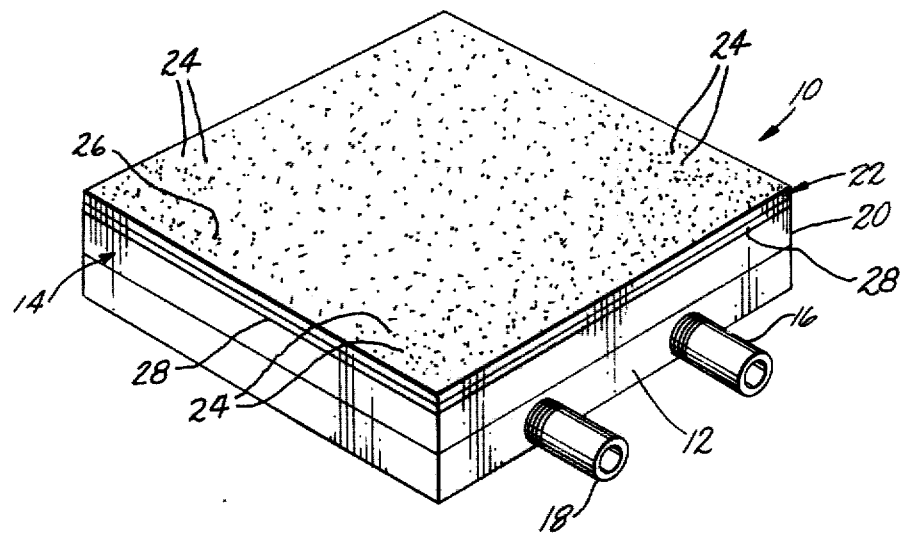

4,284,072

SOLAR COLLECTORS WITH SOLAR PANELS HAVING A PARTICULATE FERRO-ALLOY SURFACE

BACKGROUND OF THE INVENTION

The invention relates to solar panels of solar collectors and provides a solar panel having a coating of improved efficiency.

Solar collectors have been devised to use solar energy to heat and cool service systems to structures. These systems use solar collectors which heat a fluid flowing through a housing, each solar collector having at least one cooperative, substantially flat, thermally conductive solar panel providing an energy absorbent "black" surface on a metal substrate. The energy absorbent "black" surface is most economically provided as a coating.

Desired properties of the "black" surfaces are ability to adhere to the thermally conductive substrate, corrosion protection of the substrate, maximum absorption of the energy from solar radiation, minimum emissivity of infrared radiation, long range durability under solar radiation and weathering, low cost, and ease of application.

"Black" surfaces presently are either coatings applied to the surface of the substrate or an oxidized substrate surface. An example of the latter is a copper substrate having an oxidized surface. Although the oxidized surface of a copper substrate can be used as an energy absorbing surface, it is relatively expensive. Electrodeposited coatings applied to the surface of the substrate can be of iron, nickel, or chromium. The electrodeposited coatings are also relatively expensive, and have a further disadvantage in that the electrodeposition process is not reliable and proceeds at a low yield. In addition, electrodeposited coatings often deteriorate and the differences between stable and unstable coatings are not presently understood.

Electrodeposited coatings based on iron are lower in cost than electrodeposited coatings of chromium or nickel, but demonstrate a relatively low absorption of incident solar radiation.

Applied coatings based on graphite which are generally in the form of paints are lower in cost. Their major disadvantage is that most of the absorbed solar energy is lost by emittance. Graphite coatings are widely used despite low efficiency because of cost.

It is desirable to provide a low cost adherent coating on the surface of a solar panel, which has an improved spectral selectivity as compared to a coating produced using a graphite paint. "Spectral selectivity" as used in the art and in this application is the ability to absorb a large percentage of incident solar radiation while emitting only a small portion of the absorbed energy as infrared radiation.

SUMMARY OF THE INVENTION

In accordance with the present invention there is provided a more efficient solar collector. The solar collector includes a housing for flow of fluid to be heated and at least one solar panel for absorbing solar energy and converting the solar energy to heat. The solar panel has a thermally conductive substrate and an adherent coating consisting of at least one particulate ferro-alloy, said ferro-alloy based on the total weight of the ferro-alloy, containing a first constituent of about 5 to about 95 percent by weight iron, and a second constituent of at least about 5 percent by weight of an element selected from the group consisting of manganese, carbon, calcium, chromium, phosphorus, and silicon. Preferably, the ferro-alloy is adhered to the substrate by an organic binder. The presently preferred organic binder is an epoxy resin.

A feature of the ferro-alloy of the coating is that it has a high "spectral selectivity" which is the ability to absorb a large percentage of incident solar radiation while emitting only a small portion of the absorbed energy as infrared radiation.

Solar energy absorbed by the adherent coating is conducted through the thermally conductive substrate thereby heating the fluid flowing through the housing.

The heated fluid is used to service systems to structures, as for example, the fluid can be used in systems to heat structures in the winter and cool structures in the summer.

DESCRIPTION OF THE DRAWING

The attached drawing is a simplified illustration of a solar collector with a solar panel having a coating as provided in accordance with the present invention.

DETAILED DESCRIPTION

With reference to the drawing, a solar collector 10 for collecting energy from the sun consists of a housing 12 and a solar panel 14. A fluid such as water or air, is introduced through the conduit 16 and removed through the conduit 18. The solar panel consists of a thermally conductive metal substrate 20 such as steel or aluminum having an energy receptive surface 22 primarily receptive to absorbing the energy from the sun. The surface 22 in accordance with the present invention is an adherent coating comprising at least one particulate ferro-alloy 24.

Heating of the fluid may be by direct contact of the fluid with the reverse side of the solar panel or indirect by conduction to contained tubes carrying the fluid.

The particulate ferro-alloy surface 22 on the metal substrate 20 has the ability to absorb substantially all of the incident solar radiation in the visible range, with a minimum loss of absorbed energy by emittance of infrared radiation.

As indicated, the solar panel 14 is used to convert solar energy to heat. The surface 22 of the solar panel 14 is exposed to solar radiation and absorbs the incident solar radiation in the visible range, the absorbed solar radiation is converted to heat, and the heat is conducted through the metal substrate 20 to heat a fluid flowing through the housing 12.

An important feature of this invention is that the ferro-alloy absorbing surface 22 on the substrate has a high "spectral selectivity" relative to surfaces provided by known coating compositions, i.e., graphite containing compositions. The "spectral selectivity" of an energy absorbing surface can be defined by the ratio of absorptivity ($\alpha$) to emissivity ($\epsilon$). Typical energy absorbing surfaces based on graphite have a relatively low absorptivity ($\alpha$) to emissivity ($\epsilon$) ratio which approximates 1.0. As used herein, absorptivity ($\alpha$) is the percentage of incident solar radiation which is absorbed and emissivity ($\epsilon$) is the relative ability of a surface to radiate energy as compared with the ability of an ideally black surface under the same conditions to radiate energy. A "black" coating produced from a coating composition of the present invention has a relatively higher absorptivity ($\alpha$) to emissivity ($\epsilon$) ratio.

While the surface of the particulate ferro-alloy may be applied by flame deposition which achieves bonding through sintering, application is normally through a coating composition applied by conventional techniques such as spray painting, squeegee coating and the like.

Coating compositions in use for the latter application are comprised primarily of a binder and a filler of at least one particulate ferro-alloy. The ferro-alloy is comminuted, substantially inert, and refractory. In the finely divided state the appearance of the ferro-alloy is black with provided high absorptivity while the ferro-alloy retains the characteristic of reflective metals of low emissivity of infrared energy. The ferro-alloys which may be used comprise from about 5 to about 95% by weight, based on the total weight of the alloy, of a first constituent iron, and at least about 5 weight percent of a second constituent selected from the group of manganese, carbon, calcium, chromium, phosphorus, and silicon. If the second constituent is not silicon then the inert refractory ferro-alloy can comprise a third constituent of up to about 50% by weight silicon; the ferro alloy can contain as a further constituent about 0 to about 10 percent by weight manganese.

Illustrative of specific refractory ferro-alloys exclusive of impurities and minor constituents such as trace elements, there may be mentioned: 50% ferrosilicon which is comprised of about 47% by weight silicon, and about 50% by weight iron; ferromanganese silicon comprised of about 30% by weight silicon, about 64% by weight manganese and about 6% by weight iron; high carbon ferrochromium comprised of about 66% by weight chromium, about 23% by weight iron, about 8% by weight carbon and about 1% by weight silicon; ferrochromium silicon comprised of about 41% by weight silicon, about 35% by weight chromium; and about 24% by weight iron; ferrophosphorus comprised of about 70% by weight iron, about 25% by weight phosphorus, about 2% by weight silicon and about 2% by weight manganese Other ferro-alloys which may be mentioned are magnesium ferrosilicon and cerium magnesium ferrosilicon and the like.

The ferro-alloys used in a coating composition of this invention must be brittle so as to be able to be comminuted to a fine powder of less than −400 mesh (less than 35 microns) and preferably to a size of from about 1–10 microns and more preferably to a size within the range of from about 1–5 microns.

The ferro-alloy surfaces used in the practice of the principles of this invention must further be resistant to degradation from solar radiation and weathering.

In the preferred coating composition the ferro-alloy is ferrophosphorus, broadly composed of about 5 to about 95% by weight iron as the first constituent, at least about 5% by weight phosphorus as the second constituent, up to about 50% by weight silicon as the third constituent, and about 0 to about 10% of a further constituent manganese, all based on the total weight of the alloy. The preferred ferrophosphorus having a first constituent of about 70% by weight iron, about 25% by weight phosphorus, about 2% by weight silicon and about 2% by weight manganese. The preferred ferrophosphorus can also include trace amounts of other elements.

The refractory ferro-alloy comminuted to the degree of being black in appearance is blended with an appropriate organic or inorganic vehicle including a binder to produce a coating composition which when sprayed or otherwise applied to the surface of a metal substrate, causes the ferro-alloy to tenaciously adhere to the surface of the substrate. The presently preferred binder is an epoxy resin, for example, the epoxy liquid resin (RCI 38-407) manufactured by the Reichold Chemical Co., but other organic binders such as urethanes and the like can be used in such proportion to the ingredients of the coating composition so that the coating composition is flowable over the surface of the substrate.

Depending upon the particular binder which is used, the composition may also contain suitable solvents, curing agents, suspending agents, plasticizers, and the like. Exemplary of suitable solvents which may be used are: xylene, toluene, mineral spirits, methanol, ethanol, butanol, isoptopanol ethyl butyl ketone, methylisobutylketone, ethyleneglycol monobutyl ether, ethylene glycol monoethyl ether, ethylene glycol monoethyl ether acetate, ethyl acetate, butyl acetate, and the like.

Exemplary of suitable curing agents are the following: cobalt, lead, manganese, driers such as naphthanates, polyamines, such as triethylenetetramine, polyamide resins such as those prepared from a fatty dibasic acid and ethylene diamine, phosphoric acid, oxalic acid and the like.

Exemplary of suitable suspending agents are "Cab-O-SIL" a colloidal pyrogenic silica pigment manufactured by the Cabot Corporation and "AEROSIL" a pyrogenic silica made by Degussa Corporation and the like.

Exemplary of suitable plasticizers which may be used are the following: dioctyl sebacate, dioctyl phthalate, dioctyl adipate, diethylene glycol dibenzoate, castor oil, methyl recenoleate, polyesters, epoxidized soybean oil, epoxy esters tricresyl phosphate, chlorinated biphenyls, chlorinated polyphenyls, and the like.

Typically, the solvents may be present in amounts within the range of about 5 to 60% by weight of the composition while the curing agents and plasticizers may each be present in amounts up to about 70% by weight of the composition.

It is to be appreciated, of course, that the specific amounts of these components, as well as the types used, will depend in each instance upon the particular binder as well as the ultimate characteristics desired for the particular coating composition.

The thus-formulated coating composition may be applied to the metal substrate using suitable techniques, as for example, by spraying, brushing, immersion, flowing, squeegeeing or the like. The compositions are applied so as to produce a coating having a dry thickness within the range of about 0.05 mils to about 2.0 mils and typically about 0.5 mils to about 2.0 mils although the thinner coatings are preferred. Coating thicknesses which are outside of these typical ranges may also be used depending upon the particular conditions of application and intended use in each instance. Desirably, the dry coating will be made up of the binder 26 in an amount of about 3–70% by weight, and preferably about 3–50% by weight and the ferro-alloy as the filler in an amount of about 30–97% by weight and preferably about 50–97% by weight.

Following the application of the coating to the metal substrate, drying and/or curing of the coating is effected. The type and extent of the drying or curing will vary in each instance, depending upon the specific nature of the binder material which is used in the composition. Thus, in some instances, heating may be utilized to effect drying or cure of the coating while in other instances, simple air drying or curing may be sufficient.

The presently preferred coating composition is shown in Table I.

TABLE I

| Epoxy Ester Binder with a Ferrophosphorus Filler | |
|---|---|
| Material | Weight of Additive, g |
| Epoxy Ester RCI 38-407 | 62.7 |
| Polyethylene Wax MPA 60X | 29.7 |
| Cabosil M-5 | 2.2 |
| Aerosil R972 | 4.5 |
| Lime (CaO) | 4.4 |
| Ferrophosphorus | 517.0 |
| Xylene | 100.0 |
| 6% Cobalt Naphthanate | 1.03 |
| 6% Manganese Napthanate | 1.03 |
| Exkin No. 2 (Methyl Ethyl Ketoxine) | 0.63 |

Prior to application of the coating composition to the surface of the substrate, there is added 50 grams of xylene and 6 grams of an aromatic solvent (S.C. 150) per 400 grams of the above coating composition as a vehicle.

The coating composition can be applied to steel or aluminum as the preferred thermally conductive substrate of the solar panel. To improve the corrosion resistance of a steel solar panel, a thin layer 28 of zinc is normally applied to the steel, either as a galvanize or as a zinc-rich paint prior to applying a coating composition containing the particulate ferro-alloy.

EXAMPLE

A refractory ferro-alloy, ferrophosphorus, comprising about 70 weight percent iron, about 25 weight percent phosphorus, about 2 weight percent silicon, and about 2 weight percent manganese was comminuted to −400 mesh (less than 35 microns) and blended with an organic binder and other ingredients using standard coating composition formulation techniques to produce a black coating composition. The coating composition was prepared by placing 62.7 grams of epoxy liquid resin (RCI 38-407) produced by the Reichold Chemical Co. into a one pint tin can. Then 29.7 grams of a polyethylene wax (MPA 60X) produced by the Baker Castor Oil Division of National Lead Co. were added and stirred for two minutes followed by the addition of 20 grams of xylene and an additional three minutes of mixing. The next step was to add 2.24 grams of Cabosil M-5 produced by the Cabot Corporation, 4.48 grams of Aerosil R972 produced by Degussa, Inc., about 15 grams of xylene and then mix the composition for an additional five minutes at a high speed to give good shear for proper dispersion. This was followed by the addition of 3.36 grams of lime (CaO) and 517 grams of the comminuted ferrophosphorus and mixing of the composition at a high speed for 10 minutes while maintaining the temperature of the mixture below 125° F. The exterior of the can was cooled with cold water to keep the temperature below 125° F. as specified. This step was followed by the addition of 20 grams of xylene and the composition was mixed again at a high speed for an additional ten minutes. This step was followed by adding an additional 40 to 50 grams of xylene, and 1.03 grams each of 6% cobalt and 6% manganese napthanates and 0.63 grams of Exkin #2, which is Methyl Ethyl Ketoxine manufactured by Tenneco Chemicals, Inc. This entire composition is then mixed for a final three minutes. As a further step just prior to the application of the coating composition, 50 grams of xylene and about 6 grams of a high boiling aromatic solvent (S.C. 150) manufactured by Drew Chemical Corporation are added per 400 grams of coating composition. The comminuted ferro-alloy used in applying the principles of this invention can be blended with ingredients to produce a "black" coating composition comprising a formulation other than the formulation used in this example.

The "black" coating composition was then sprayed onto a clean surface of a four inch by eight inch steel plate. The spraying of the black coating composition onto the surface of the steel plate produced a coating on the plate, the coating having a thickness of approximately 2 mils. The coated surface of the steel plate was exposed to solar radiation covering a 350 to 2400 nm wavelength range at a 20° incident angle. Absolute hemispherical spectral reflectance measurements were performed in accordance with ASTM E-424-71 Method A to measure the percentage reflectance ($\rho$). The percentage reflectance ($\rho$) as used herein is that percentage of incident solar radiation reflected by the coated surface. The percentage reflectance ($\rho$) was measured as 8.9% and the percentage absorptivity ($\alpha$) of 91.1% was thereby calculated.

Total emittance measurements were performed with a Devices and Services Company emissometer, Model AE, equipped with a Model RD-1 scaling digital voltmeter.

The detector portion of the emissometer was heated to 180° F. so that the sample did not have to be heated. The detector responds only to radiation heat transfer and is designed to have an output linear with emissivity. Being a differential thermopile with sensing elements of aluminum foil and black paint, the detector has a near-constant response to thermal wavelengths of from 3 to 30 microns.

The four inch by eight inch steel plate with the "black" coating adherent to the surface and a flat black standard of known emittance (0.93) were placed on a heat sensor and allowed to stabilize to ambient conditions. The detector was placed on a flat black standard for approximately one minute, and the voltage output was recorded. The detector was then placed on the four inch by eight inch steel plate for approximately one minute, and the voltage output was recorded. The emittance of the four inch by eight inch steel plate with the black coating composition applied to the surface was calculated as follows:

$$\epsilon_1 = \frac{V_1}{V_2} (\epsilon_2)$$

where
$\epsilon_1$ = Emittance of the coating on the surface of the steel plate
$\epsilon_2$ = Emittance of the black standard
$V_1$ = Voltage output from the coating on the surface of the steel plate
$V_2$ = Voltage output of the black standard $$\epsilon_1 = \frac{2.05}{2.57} (0.93)$$
$$\epsilon_1 = 0.74 \pm 0.01$$

The total hemispherical emittance of the coated surface of the steel plate was therefore measured as 0.74±0.01.

The above measurements of absorptivity and emittance gave an unexpectedly high "spectral selectivity" as defined by the ratio of absorptivity ($\alpha$) to emissivity ($\epsilon$) of 1.23. The ratio of 1.23 is substantially higher than the absorptivity ($\alpha$) to emissivity ($\epsilon$) ratio of approximately 1.00 found where a coating composition based on graphite is used to coat a metal substrate for use as a solar panel. The absorptivity ($\alpha$) to emissivity ($\epsilon$) ratio of 1.23 is also higher than expected for a coating of over 1 mil thickness. It is expected that emittance is substantially proportional to coating thickness, and therefore that emittance can be reduced by reducing the coating thickness from about 2 mil to substantially less than 2 mils.

The reduction of the emittance will further increase the absorptivity ($\alpha$) to emissivity ($\epsilon$) ratio.

Although the present invention has been described with reference to particular details and embodiments thereof, the particulars are intended to illustrate the invention, and many variations within the scope of the following claims will be apparent to those skilled in the art.

What is claimed is:

1. In a solar collector which includes a housing adapted to passage of a fluid therethrough and at least one solar panel for absorbing solar energy and transfer of such solar energy in the form of heat to a fluid passing through the housing, said solar panel being formed of a thermally conductive metal substrate and a solar energy receptive layer for exposure to solar energy, the improvement which comprises providing, as the solar energy receptive layer, a layer adherent to the thermally conductive metal substrate which layer contains at least one particulate, brittle ferro-alloy of high absorptivity and low infrared emissivity, the brittle ferro-alloy comprising, based on the total weight of the ferro-alloy,
   (i) a first alloyed constituent of from about 5 to about 95% by weight iron and
   (ii) a second alloyed constituent of at least about 5% by weight of an element selected from the group consisting of manganese, carbon, calcium, chromium, phosphorus, and silicon.

2. The solar collector as claimed in claim 1 wherein the ferro-alloy comprises, based on the total weight of the ferro-alloy, a first alloyed constituent of from about 5 to about 95% by weight iron, a second alloyed constituent of at least about 5% by weight of an element selected from the group consisting of manganese, carbon, calcium, chromium, and phosphorus, and as a third constituent, silicon present in an amount up to about 50% by weight.

3. The solar collector as claimed in claim 1 wherein the ferro-alloy comprises based on the total weight of the ferro-alloy, a first alloyed constituent of from about 5 to about 95% by weight iron, a second alloyed constituent of at least about 5% by weight phosphorus, a third alloyed constituent of up to about 50% by weight silicon and a fourth alloyed constituent of from about 0 to about 2% by weight manganese.

4. The solar collector as claimed in claim 1 wherein the ferro-alloy comprises, based on the total weight of the ferro-alloy, first alloyed constituent of about 70% iron, a second alloyed constituent of about 25% phosphorus, a third alloyed constituent of about 2% silicon, and a fourth alloyed constituent of about 2% manganese.

5. The solar collector as claimed in claim 1 wherein the thermally conductive substrate is steel.

6. The solar collector as claimed in claim 5 in which a layer of zinc is deposited between the layer containing the ferro-alloy and the steel substrate.

7. The solar collector as claimed in claim 1 wherein the thermally conductive substrate is aluminum.

8. The solar collector as claimed in claim 1 wherein the thickness of the energy receptive layer is from about 0.05 mils to about 2.0 mils.

9. The solar collector as claimed in claim 1 wherein the average particle size of the particulate ferro-alloy is less than about 10 microns.

10. The solar collector as claimed in claim 1 in which the particulate ferro-alloy is adhered to the thermally conductive substrate by a binder.

11. The solar collector as claimed in claim 10 in which the binder includes an organic epoxy resin.

12. The solar collector as claimed in claim 1 in which the energy receptive layer contains at least about 50% by weight, based on the weight of the energy receptive layer, of the particulate ferro-alloy.

13. In a solar collector which includes a housing adapted to passage of a fluid therethrough and at least one solar panel for absorbing solar energy and transfer of such solar energy in the form of heat to a fluid passing through the housing, said solar panel being formed of a thermally conductive metal substrate and a solar energy receptive layer for exposure to solar energy, the improvement which comprises providing, as the solar energy receptive layer, a layer adherent to the thermally conductive metal which layer contains:
   (a) at least about 50% by weight, based on the weight of the layer, of at least one particulate brittle ferro-alloy of high absorptivity and low infrared emissivity, the brittle ferro-alloy comprising, based on the weight of the ferro-alloy,
      (i) a first alloyed constituent of from about 5 to about 95% by weight iron; and
      (ii) a second alloyed constituent of at least about 5% by weight of an element selected from the group consisting of manganese, carbon, calcium, chromium, phosphorus, and silicon; and
   (b) a binder for binding together the particulate ferro-alloy and adhering the ferro-alloy to the surface of the thermally conductive metal substrate.

14. The solar collector as claimed in claim 13 wherein the ferro-alloy comprises, based on the total weight of the ferro-alloy, a first alloyed constituent of from about 5 to about 95% by weight iron, a second alloyed constituent of at least about 5% by weight of an element selected from the group consisting of manganese, carbon, calcium, chromium, and phosphorus, and as a third constituent, silicon present in an amount up to about 50% by weight.

15. The solar collector as claimed in claim 13 wherein the ferro-alloy comprises, based on the total weight of the ferro-alloy, a first alloyed constituent of from about 5 to about 95% by weight iron, a second alloyed constituent of at least about 5% by weight phosphorus, a third alloyed constituent of up to about 50% by weight silicon and a fourth alloyed constituent of from about 0 to about 2% by weight manganese.

16. The solar collector as claimed in claim 13 wherein the ferro-alloy comprises, based on the total weight of the ferro-alloy, a first alloyed constituent of about 70% iron, a second alloyed constituent of about 25% phosphorus, a third alloyed constituent of about 2% silicon, and a fourth alloyed constituent of about 2% manganese.

17. The solar collector as claimed in claim 13 wherein the thermally conductive substrate is steel.

18. The solar collector as claimed in claim 17 in which a layer of zinc is deposited between the layer containing the ferro-alloy and the steel substrate.

19. The solar collector as claimed in claim 13 wherein the thermally conductive substrate is aluminum.

20. The solar collector as claimed in claim 13 wherein the thickness of the energy receptive layer is from about 0.05 mils to about 2.0 mils.

21. The solar collector as claimed in claim 13 wherein the average particle size of the particulate ferro-alloy is less than about 10 microns.

22. The solar collector as claimed in claim 13 in which the binder includes an organic epoxy resin.

23. In a solar collector which includes a housing adapted to passage of a fluid therethrough and at least one solar panel for absorbing solar energy and transfer of such solar energy in the form of heat to a fluid passing through the housing, said solar panel being formed of a thermally conductive metal substrate and a solar energy receptive layer for exposure to solar energy, the improvement which comprises providing as the solar energy receptive layer a layer adherent to the thermally conductive metal substrate which layer contains:
   (a) about 50 to about 97% by weight, based on the weight of the layer, of at least one particulate, brittle ferro-alloy of high absorptivity and low infrared emissivity, the ferro-alloy having an average particle size of less than about 10 microns and comprising, based on the total weight of the ferro-alloy,
      (i) a first alloyed constituent of about 70% by weight iron;
      (ii) a second alloyed constituent of about 25% by weight phosphorus;
      (iii) a third alloyed constituent of about 2% by weight silicon; and
      (iv) a fourth alloyed constituent of about 2% by weight manganese; and
   (b) an organic epoxy resin binder for binding together the particulate ferro-alloy and adhering the ferro-alloy to the surface of the thermally conductive metal substrate.

24. The solar collector as claimed in claim 23 wherein the thermally conductive substrate is steel.

25. The solar collector as claimed in claim 24 in which a layer of zinc is deposited between the layer containing the ferro-alloy and the steel substrate.

26. The solar collector as claimed in claim 23 wherein the thermally conductive substrate is aluminum.

27. The solar collector as claimed in claim 23 wherein the thickness of the energy receptive layer is from about 0.05 mils to about 2.0 mils.

* * * * *